United States Patent [19]
Fender et al.

[11] Patent Number: 5,300,784
[45] Date of Patent: Apr. 5, 1994

[54] SELENIUM ALLOY X-RAY IMAGING MEMBER ON TRANSPARENT SUBSTRATE

[75] Inventors: William D. Fender; Eddie M. Zanrosso, both of Pasadena; Algird G. Leiga, Claremont, all of Calif.; Lothar S. Jeromin, Newark, Del.; Phillip G. Perry, Webster, N.Y.

[73] Assignee: Xerox Corporation, Stamford, Conn.

[21] Appl. No.: 891,109

[22] Filed: Jun. 1, 1992

[51] Int. Cl.⁵ ............... G03G 15/00; G03G 5/00
[52] U.S. Cl. ................... 250/484.2; 250/591; 430/73; 430/85
[58] Field of Search .......... 430/75, 85; 250/591, 250/484.2

[56] References Cited

U.S. PATENT DOCUMENTS 3,655,377  4/1972  Sechak ................... 430/95
4,842,973  6/1989  Badesha et al. ......... 430/128
4,868,077  9/1989  Narita ..................... 430/85

Primary Examiner—John Kight, III
Assistant Examiner—Jeffrey Culpeper Mullis
Attorney, Agent, or Firm—Robert Cunha

[57] ABSTRACT

A selenium alloy electrophotographic imaging member having an optically transparent NESA coated substrate. An x-ray image is formed from the side of the photoreceptor opposite the transparent substrate and then is scanned from the back side through the transparent substrate with a fine beam of light, the position of which is precisely monitored. The ensuing discharge from the light beam is detected by a non-contacting x-ray transparent electrode located on the outer side of the photoreceptor, away from the substrate, which reads the discharge signal through capacitive coupling, pixel by pixel, according to the position of the light beam, to form a high resolution raster pattern digital readout of the image.

2 Claims, 2 Drawing Sheets

SELENIUM ALLOY X-RAY IMAGING MEMBER ON TRANSPARENT SUBSTRATE

BACKGROUND OF THE INVENTION

The invention described herein relates to digital electrophotographic imaging systems and in particular to selenium based photoreceptors used for digital as well as conventional dry powder imaging.

The prior art includes the following:

W. D. Fender, "Quantification of the Xeroradiographic Discharge Curve," SPIE Vol. 70, 1975, 364. Chlorine and arsenic doped amorphous selenium photoreceptors are disclosed having a thickness of 120 to 300 microns. The x-ray photogeneration constant and relationship of charging potential to photogenerated charge signal are measured and quantified. In reference to this invention, the paper shows that the photogenerated charge signal is directly proportional to the internal field or charging potential (for a given selenium thickness) that the photoreceptor can sustain without exhibiting excessive artifact levels.

W. Hillen et al., "Imaging Performance of a Selenium Based Detector for High-Resolution Radiography," SPIE Med. Imaging III, 1989 and "A Selenium Based Detector System for Digital Slot Radiography," SPIE Vol. 914, Medical Imaging II, 1988. A selenium drum x-ray fan-scanning ganged detector readout system is described. The x-ray source slit may increase tube loading and exposure times to excessive levels. Coupling of the two scanning slits and drum synchronization over the object or patient may be awkward due to the possible interference of these various members.

D. M. Korn et al., "A Method of Electronic Readout of Electrophotographic and Electroradiographic Images," JAPE, Vol. 4, No. 4, Fall, 1978. An amorphous selenium photoconductor fashioned in a strip electrode configuration and associated electronic readout are described. The system is on an opaque substrate and is designed for front exposure and readout. The proposed device may not have the resolution capability needed for mammography due to the embedded strip configuration. Further, processes which allow high charging and prevention of artifacts and crystallization are not discussed.

U. Schiebel, "Image Quality in Selenium Based Digital Radiography," SPIE vol. 626, Medicine XIV, PACS IV, 1986. A front surface exposure, strip-electrode probe front surface reading system is described utilizing a conventional selenium receptor. No provisions are made for back surface access, minimization of crystallization nor for high charging fields and the ensuing increase in sensitivity and charge signal.

R. C. Speiser et al., "Dose Comparisons for Mammographic Systems," Med. Phys. 13(5), September/October, 1986, 667. A selenium photoreceptor is disclosed and x-ray sensitivity is discussed and compared with film screen mammographic imaging.

In U.S. Pat. No. 3,970,844 to Finn Jr. et al., an ionographic gaseous x-ray receptor scanning system is disclosed which utilizes embedded electrode strips for image readout. Ionographic systems require a large thick-walled somewhat bulky design due to the need to pressurize the ionographic gas. The embedded electrode strips may not provide the resolution needed for x-ray mammography.

In U.S. Pat. No. 4,085,327 to Swank et al., a charge readout device utilizing a receptor of transparent layers of strips in such a manner as to minimize the series capacitance in parallel with the output signal. Little is said about the photoconductive x-ray sensitive material or about how such a device would be manufactured. Again, resolution may be limited by the strip spacing.

In U.S. Pat. No. 4,126,457 to Ciuffini, a method for producing a flexible photoreceptor is disclosed wherein the photoreceptor comprises a selenium alloy layer containing a concentration gradient of arsenic. The thickness of the alloy layer deposited in the working examples was about 60 microns, a typical thickness for line copier receptors and is below the 100 to 400 micron thickness needed for x-ray imaging. The photoreceptor of Ciuffini can contain high levels of arsenic which can cause reticulation, a chronic failure mode of thermally relaxed selenium x-ray photoreceptors not having correctly configured arsenic profiles.

In U.S. Pat. No. 4,298,671 to Kassel et al., an electrophotographic recording material is disclosed comprising a layer of amorphous selenium and a layer of crystalline selenium. The device consists of an opaque electrically conductive substrate upon which is vapor deposited a thin layer of tellurium. A layer of crystalline selenium is deposited on the tellurium followed by a layer of amorphous selenium on the crystalline selenium layer. The photoreceptor of Kassel et al., is designed for monopolar transport on an opaque substrate and is not configured for image scanning from the back surface.

In U.S. Pat. No. 4,521,808 to Ong et al., an image scanning apparatus is disclosed for obtaining a radiographic image. The photoreceptor is a standard Xerox 125 selenium plate with a Mylar top surface transparent electrode added. The device x-ray images through the 0.080 inch aluminum substrate which significantly increases the radiographic patient dose and renders the unit impractical for mammography. Laser scanning is performed from the top side through the added Mylar electrode which is used for image readout.

In U.S. Pat. No. 4,770,965 to Fender et al., a state-of-the-art one hundred and fifty micron thick photoreceptor is described in Example I, while an improved thick, high-sensitivity 320 micron photoreceptor is described in Example II. The examples and claims do not, however, include a transparent substrate for digital scanning nor is a multilayered configuration having a fractionated arsenic profile disclosed, other than requiring the top surface arsenic level not exceed 2% to prevent the reticulation artifact, a catastrophic wrinkling of the top surface.

In U.S. Pat. No. 4,961,209 to Rowlands et al., an x-ray image-scanning system is disclosed which utilizes a standard flat selenium photoreceptor having a movable transparent slit sensor electrode through which a traversing light beam discharges the photoreceptor in a raster pattern after x-ray exposure. One function of the moving slit electrode is to minimize the coupling capacitance in parallel with the sensed signal charge. The disclosure does not teach a transparent substrate nor does it specify arsenic profiling at either of the interfaces to minimize artifacts, increase life, charging potential or image contrast.

In U.S. Pat. No. 5,023,661 to Fender et al., a precharging process step is described for the x-ray selenium photoreceptor used in Xeromammography which removes a critical artifact called x-ray fatigue. The interface crystalline origin of the fatigue artifact and its role in injecting spurious charge into the photoreceptor is also shown in detail. The disclosure does not teach an arsenic profile at the interface which would eliminate the microcrystallites and the fatigue artifact they produce.

SUMMARY OF THE INVENTION

This invention is a selenium alloy electrophotographic imaging member having either an optically transparent NESA coated substrate or a conventional aluminum substrate, comprised of an arsenic-chlorine doped x-ray and light sensitive bulk layer of 100 to 400 microns in thickness. Said bulk layer shall have a fractionated arsenic rich layer at the surface not to exceed 10 microns in thickness having a bulk concentration of arsenic of 0.1 to 0.6 percent by weight nor to exceed 4 percent in top surface arsenic concentration. Further, said bulk layer shall be interposed between two arsenic rich protective layers, one on the top surface and the other on the opposite side contiguous with the substrate, either protective layer having a thickness of 0.05 to 5 microns.

The x-ray image is formed from the side of the photoreceptor opposite the transparent substrate and then is scanned from the back side through the transparent substrate with a fine beam of light, the position of which is precisely monitored. Said scanning light beam may be a gas laser such as Helium-Neon, Argon or dye laser or could be an aluminum doped gallium arsenide laser or diode array. The beam positioning and monitoring may be controlled by angulated or polygon mirrors, flexible fiber optics or through multiaxis translation as in the case of a laser diode array. The ensuing discharge from the aforementioned light beam is detected by a non-contacting x-ray transparent electrode located on the outer side of the photoreceptor, away from the substrate which reads the discharge signal through capacitive coupling, pixel by pixel, according to the position of the light beam, to form a high resolution raster pattern digital readout of the image suitable for digital processing, enhancement, hard copy generation and CRT monitor display.

In the past, selenium x-ray photoreceptors have been degraded by crystallization related artifacts due to a deficiency in arsenic which is required to yield low dark decay and a maximum x-ray sensitivity. In this invention, increased concentrations of arsenic are placed where they will be the most effective, at the substrate interface and at the top surface. One of the added benefits of correct arsenic placement, in addition to reduced crystallization related artifacts, is longer photoreceptor life and an increase in the allowed charging potential which results in greater x-ray sensitivity and image quality. The invention, therefore, is a durable, longer-life, increased sensitivity, multilayered x-ray selenium photoreceptor deposited on an optically transparent substrate described in the context of a high resolution image scanner.

A major advantage of the invention is to provide access to the photoreceptor from both sides for x-ray exposure, light beam discharge scanning and sensing of the discharge magnitude on a pixel by pixel basis. Typically, scanning systems proposed to date exhibit high dose due to x-ray exposure through a heavily attenuating aluminum substrate or are awkward and mechanically complex from various mechanisms needed to discharge and simultaneously read the discharge signal from the top surface.

Further, photoreceptor durability and resistance to crystallization and the various associated artifacts have imposed serious constraints on digital and conventionally-developed systems from the viewpoints of both cost and design. The device described herein overcomes these limitations through the use of an optimally configured arsenic fractionated layer at the surface of the bulk deposited selenium and through the use of high arsenic protective layers above and below said bulk layer. The result of this invention is a practical system configuration for achieving high resolution digital mammography or radiography with a longer life, artifact-resistant photoreceptor capable of sustaining greater internal fields associated with increased charging potentials resulting in greater x-ray sensitivity and improved image quality.

It is, therefore, an object of the present invention to provide an electrophotographic digitized x-ray image scanning system which overcomes the problems encountered with electrophotographic digitized image scanning systems of the prior art.

It is a further object of the present invention to provide a digitized x-ray scanning system which allows x-ray exposure and subsequent reading from the top side of the photoreceptor while light-beam discharge-scanning is performed from the substrate side of the photoreceptor.

It is a further object of the present invention to provide an improved amorphous selenium x-ray photoreceptor which overcomes problems encountered with amorphous x-ray selenium photoreceptors of the prior art.

It is a further object of the present invention to provide an amorphous selenium photoreceptor having either an optically transparent substrate to allow discharge of said photoreceptor from the rear through the transparent substrate or a conventional aluminum substrate like that described in U.S. Pat. No. 4,770,965.

It is a further object of the present invention to provide an amorphous selenium photoreceptor which minimizes localized selenium crystallization at the top surface and at the substrate interface and minimizes artifacts associated with said crystallization such as x-ray fatigue.

It is a further object of the present invention to specify a vacuum coating process which will provide the arsenic gradients at the top surface and at the substrate interface which are needed to retard the formation of localized crystallization sites and the resultant artifacts associated with said crystallites such as x-ray fatigue. Moreover, the top surface arsenic profile will be specified in such a way that reticulation, a catastrophic wrinkling of the top surface caused by excessive arsenic levels, will be avoided.

It is a further object of the present invention to provide a more x-ray sensitive photoreceptor which results from the better interface protection provided by the increased arsenic concentrations present at the top surface and substrate interfaces thereby allowing higher photoreceptor charging potentials to be used. The increased photogeneration provided by higher charging levels has an added benefit of providing greater charge contrast which results in improved image contrast and better visualization of image detail.

It is a further object of the present invention to provide a longer-life photoreceptor which can withstand the rigors of the thermal relaxation process typically used to remove the prior residual image from the photoreceptor. Because x-ray photoreceptors typically last only a few hundred cycles, the improvement in cycle life provided by this invention would lower the cost to the customer.

It is a further object of the present invention to provide an increased photoreceptor yield in the manufacturing process through a reduction in surface and substrate interface crystallization artifacts and the defect sites that result from such crystallites.

It is a further object of the present invention to provide a means for stripping and recoating the organic overcoating, when the need occasionally arises, without the use of a separate stripping operation.

DETAILED DESCRIPTION OF THE INVENTION

The amorphous x-ray selenium photoreceptor of this invention utilizes a transparent substrate over which is formed an optically-transparent electrically-conductive electrode such as NESA, tin oxide. To minimize selenium crystallization and crystallization related artifacts, hitherto a major problem in photoreceptors of this type, the photoreceptor arsenic profile is configured at the top surface facing away from the substrate and at the interface adjacent to the substrate in such a manner as to minimize the formation of selenium crystallites and concomitant artifacts such as x-ray fatigue. The aforementioned arsenic profiling is accomplished through two distinct methods. First, the high arsenic layers at the substrate interface and at the top surface are applied through evaporation of a separate high arsenic containing alloy evaporated from small crucible strings in the vacuum coater which are separate from the primary array. Secondly, due to the tendency for arsenic to fractionate within the selenium arsenic melt, the top surface arsenic layer which results due to fractionation is tailored to a thickness range and to a maximum and a minimum top surface concentration range of 1.5 to 2.5 percent as measured with secondary ion mass spectometry, SIMS.

Above the photoreceptor is a conductive electrode which may be either contacting or non-contacting with respect to the photoreceptor surface. The electrode may be a thin sheet of aluminized Mylar so as to provide a light seal for the underlying photoactive charged selenium layer and so as to provide minimal attenuation of a low photon energy mammographic x-ray beam. The electrode is connected to a high-gain, low-noise electronic preamplifier.

Below the photoreceptor, on the side facing the transparent substrate, is an optical scanning system which may consist of a focused gas laser light source or a solid state laser diode array light source which scans the photoreceptor in a raster grid pattern through the transparent back surface. The laser or non-coherent light source may be pulsed to aid in quantizing the pixel elements of the image or it may operate continuously. The location and position of the finely focused light source is precisely controlled through the use of stepper motors or through the use of optical encoders.

As the previously charged and x-ray exposed photoreceptor is scanned from the back surface with said light beam, the residual signal resulting from the complete discharge of the photoreceptor is sensed by the top surface electrode and preamplifier so that a residual signal level is sensed for each known position of discharge on the photoreceptor thus forming a pixel map of the image suitable for digital storage and computer manipulation and enhancement as required by the needs of the customer.

Figure 1:
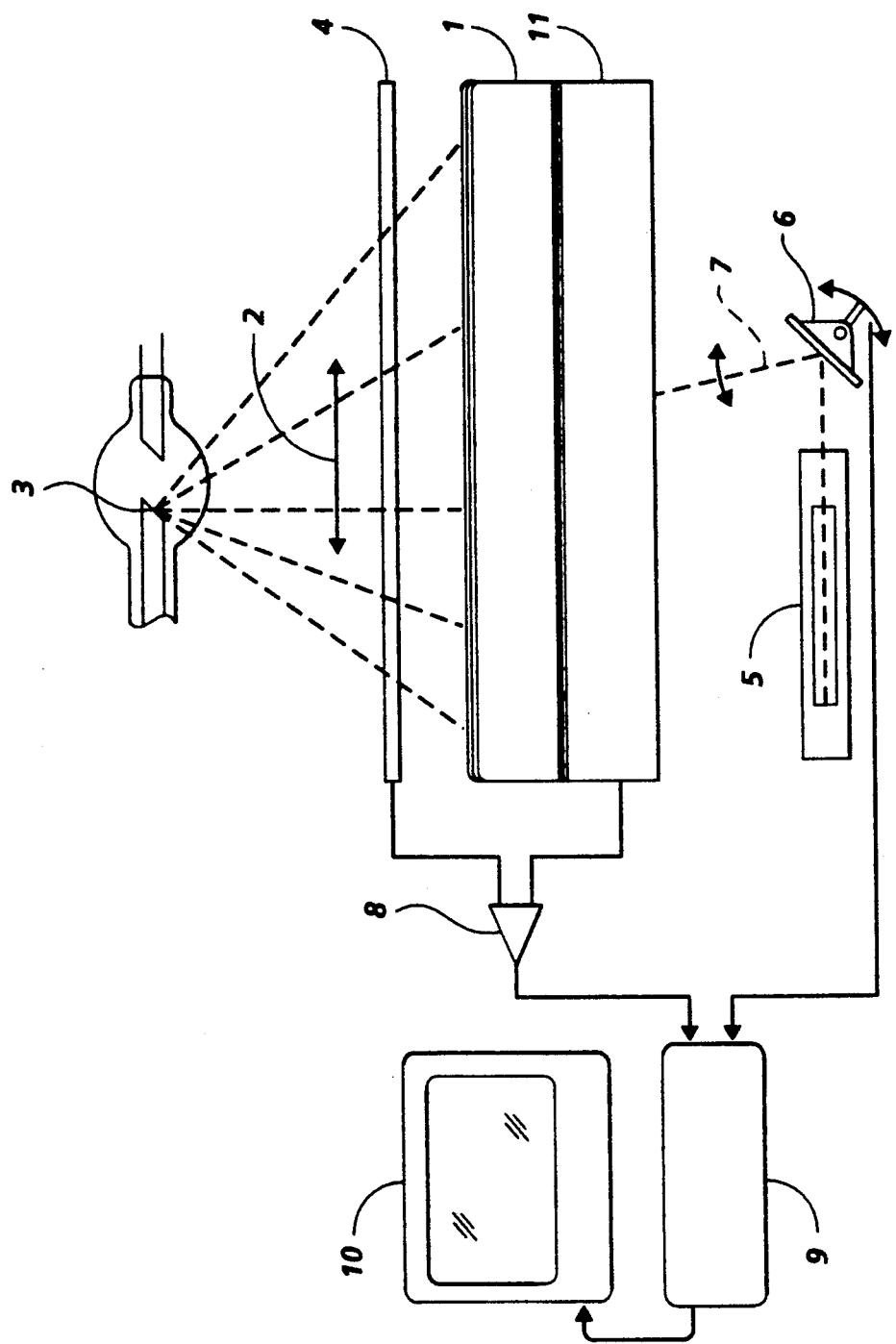
FIG. 1 is a block diagram of the digital scanner and photoreceptor.

This invention is based on an amorphous selenium photoreceptor based x-ray imaging system capable of producing a raster-scanned image suitable for digital processing, hard copy generation and video display. Both FIGS. 1 and 2 show the photoreceptor in cross sectional view and are distorted in scale so that the critical elements of the invention may be seen more clearly.

The system, shown in FIG. 1, functions in the following manner: The amorphous selenium photoreceptor (1) is charged to a uniform potential between 7 and 14 volts per micron as described in U.S. Pat. No. 4,770,965. The entire disclosure of this patent is incorporated herein by reference. An x-ray object or patient (2) is interposed between an x-ray source (3) and the charged photoreceptor. An x-ray transparent electrode (4) such as aluminized Mylar is either in contact with or just above the photoreceptor surface. The x-ray is made in the usual manner and the patient is released. The back side of the photoreceptor is then scanned through the transparent substrate in a raster pattern with a focused light source such as a solid state or a gas laser (5) using a polygon or rotating mirror (6) to discharge the residual image potential remaining on the photoreceptor.

The laser or incoherent light source may operate in either a pulsed or a continuous mode. The position of the scanning light beam (7) is precisely known from a stepper motor drive or an optical encoder angle position sensor system. The discharge from the light beam is sensed by the top surface aluminized mylar electrode (4) and is amplified by the preamplifier (8). This preamplified image signal and the position signals from the encoder position sensors are input to the computer (9) serially throughout the raster scan duration. The digitized image information may be enhanced with the appropriate algorithm desired by the operator and displayed on the high resolution CRT monitor (10).

Figure 2:
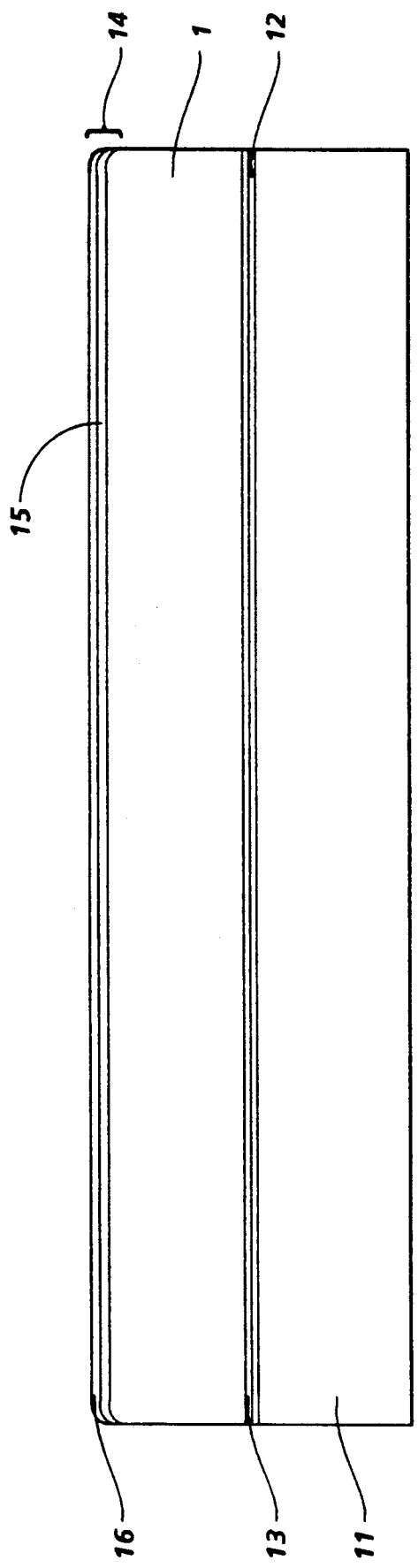
FIG. 2 is a cross-section of the photoreceptor shown in greater detail.

The photoreceptor, shown in FIG. 2, consists of either a transparent substrate (11), as in the case of the image scanner described herein, or may be a conventional aluminum substrate as described in U.S. Pat. No. 4,770,965. The transparent substrate (11) would be coated with a NESA tin oxide interface (12) to a resistivity of 100 to 10,000 ohms per square. The NESA coated substrate is cleaned with a suitable cleaning agent such as deionized water and is mounted in a mask assembly which is placed on the vacuum coater rotating mandril assembly. The described transparent substrate is of greatest value in digital imaging; however, it could be used in a conventional powder or liquid development system as well, in place of the standard aluminum substrate. Similarly, the following photoreceptor improvements and features exemplify the optimal configuration for a digital x-ray imaging photoreceptor and for a conventional aluminum substrate photoreceptor as well. The photoreceptor related portion of this invention therefore applies to conventional powder or liquid development as well as to digital imaging using either a transparent or a conventional aluminum substrate.

After heating the mandril mounted substrate with a glow discharge cycle to a minimum temperature of about 85° C. (185° F.) an interface layer (13) of 1 to 24 percent arsenic selenium is evaporated to a thickness of 0.1 to 5 microns. The purpose of said high arsenic interface layer is to retard crystallite formation at the interface and to thereby avoid such interface crystallite caused artifacts as x-ray fatigue as described in U.S. Pat. No. 5,023,661.

The aforesaid interface layer is followed by a vacuum deposition of the bulk layer (1) of amorphous selenium as described in the six examples of U.S. Pat. No. 4,770,965. The evaporation cycle and ensuing arsenic fractionation which, if carried to completion, could result in an excessive level of top surface arsenic, is cut off at a precise point to allow just enough arsenic to harden the photoreceptor surface against crystallization but not so much as to result in a catastrophic reticulation failure mode which is a wrinkling of the top surface.

The top surface arsenic profile (14) and concentration that has been found most suitable with respect to the aforesaid tradeoff between crystallization minimization and reticulation is one which ramps approximately linearly from the bulk concentration of about 0.3 percent by weight to a top surface arsenic concentration of, typically, 1 to 4 percent, and ideally, 1.5 to 2.5 percent over a depth of 3 to 10 microns. Arsenic concentration is measured with a secondary ion mass spectrometer, SIMS, using an $O_{16}$ oxygen primary beam of 80 to 90 nanoamperes at an accelerating potential of 12.5 KV.

A thin top surface layer of up to 24% but preferably 1 to 3 percent arsenic (15) is applied from a third small crucible string to a thickness of 8 to 5 microns but preferably of 0.2 to 2 microns at a crucible evaporation temperature of 315° C. (600° F.) to 371° C. (700° F.). This evaporation, as in the case of the interface protective layer, is performed rapidly and proceeds to completion in a matter of seconds, unlike the previously described much thicker bulk layer (1). The purpose of this third and final high arsenic surface layer is to provide additional protection against top surface crystallization typically induced by a thermal relaxation step used to remove the prior residual image. This final layer of high arsenic selenium also protects against the abrasive action of a photoreceptor cleaning step, as in the case of brush cleaning in a conventional dry powder imaging process.

An organic cyclohexanone solvent based overcoating (16) is applied under clean-room conditions according to the procedure outlined in U.S. Pat. No. 4,770,965, again to provide added top surface protection from chemical as well as thermal and mechanically induced crystallization.

Although the invention has been described with reference to specific preferred embodiments, it is not intended to be limited thereto, rather those skilled in the art will recognize that variations and modifications may be made therein which are within the scope of the invention and within the scope of the claims.

We claim:

1. Apparatus for producing a digitized x-ray image comprising:
    a photoreceptor comprising an upper portion of amorphous selenium 100 to 400 microns in thickness and having an arsenic concentration of 0.1 to 0.6 by weight for receiving an x-ray image originating above said photoreceptor, and a bottom transparent substrate,
    a light beam scanner below said photoreceptor for discharging a charge on said selenium by said light beam, and
    an x-ray transparent electrode above, but not in contact with, said selenium for sensing the discharge of said selenium by said light beam.

2. The apparatus of claim 1 wherein the upper surface of said substrate comprises a transparent NESA layer through which optical light beam discharge may be performed for the purpose of image scanning.

* * * * *